United States Patent
Fasen

(10) Patent No.: US 7,208,857 B2
(45) Date of Patent: Apr. 24, 2007

(54) DRIVE CALIBRATION METHOD AND SYSTEM

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 11/015,426

(22) Filed: Dec. 16, 2004

(65) Prior Publication Data

US 2006/0131988 A1  Jun. 22, 2006

(51) Int. Cl.
*H02N 1/00* (2006.01)
*H01L 41/04* (2006.01)

(52) U.S. Cl. .................................. 310/309; 318/116

(58) Field of Classification Search ............... 310/309; 318/116

See application file for complete search history.

(56) References Cited

U.S. PATENT DOCUMENTS

| 4,546,292 | A | * | 10/1985 | Audren et al. ............. 318/116 |
| 5,986,381 | A | * | 11/1999 | Hoen et al. ................ 310/309 |
| 6,753,664 | B2 | * | 6/2004 | Neufeld et al. ............ 318/116 |
| 6,911,792 | B2 | * | 6/2005 | Fasen ......................... 318/116 |
| 7,038,878 | B2 | * | 5/2006 | Tran et al. .................... 360/88 |
| 2003/0178913 | A1 | * | 9/2003 | Norimatsu ................. 310/309 |

* cited by examiner

*Primary Examiner*—Burton Mullins

(57) ABSTRACT

A method and system of calibrating a drive includes changing an electrode voltage between a first set of electrodes and a second set of electrodes in the drive divided by an electrode gap, determining a threshold voltage for the electrode voltage at which an electrostatic attractive force causes the first set of electrodes to be drawn to the second set of electrodes and calculating an operational electrode voltage between the first set of electrodes and the second set of electrodes using the threshold voltage that allows the drive to operate while one or more external accelerations are acting upon the drive.

32 Claims, 5 Drawing Sheets

DRIVE CALIBRATION METHOD AND SYSTEM

BACKGROUND

The present invention relates to electrostatic motors. Electrostatic motors rely on the electrostatic force generated between charges. This electrostatic force between charges at rest, as described by Coulomb's law, is directly proportional to the product of the charges and inversely proportional to the square of the distance between the charges. Consequently, to create an electrostatic drive using moderate voltages it is important to place the electrodes of an electrostatic motor extremely close together. For example, halving the distance between electrodes increases the electrostatic force between them by a factor of four without increasing the voltage.

The smaller tolerances and distances necessary for electrostatic motors can be realized using micro electromechanical systems (MEMS). MEMS use many of the same processing techniques to achieve similar or equivalent manufacturing tolerances associated with the on-chip or on-wafer tolerances of the semiconductor industry. The MEMS-based electrostatic motors typically takes the form of a moveable element or "mover" and a stationary element or "stator" produced as separate subassemblies using MEMS. As a result, these individual mover and stator elements can be manufactured to exacting specifications.

However, individual MEMS components are often assembled together using more traditional and less accurate manufacturing processes. In the case of electrostatic motors, these less accurate manufacturing processes do not inherently provide the necessary tolerance required to place the mover and stator elements in a proper position for reliable electrostatic motor operation. Accordingly, the precision assembly of MEMS components used in electrostatic motors and other devices requires advanced manufacturing techniques to make them function and operate reliably over time.

Improving traditional manufacturing techniques is becoming even more important as high-density storage devices specify use of MEMS-based electrostatic motors. In one particular design, a linear electrostatic motor using MEMS mover and stator assemblies is responsible for accurately driving a platform supporting a storage medium. An atomically sharp needle in a fixed position writes and reads the storage medium by depositing and sensing extremely small charges on the storage medium. The needle both stores and reads large amounts of information as the aforementioned MEMS components in the linear electrostatic motor control very small movements of the platform holding the storage medium. Unfortunately, the larger tolerances associated with traditional manufacturing affects both the storage capacity and reliability of the resulting high-density storage device driven by a linear electrostatic motor with MEMS mover and stator.

After manufacture, it is also important for these high-density storage devices to maintain a certain alignment or registration between the platform holding the storage medium and the various MEMS assemblies in the motor. If this registration cannot be maintained, the data transfer to and from the drive may be interrupted or result directly in data loss. This is particularly important when these high-density storage devices are used in portable electronic devices such as still cameras, motion cameras, personal digital appliances, cell phones and music players as normal use often includes substantial "g-shock" type accelerations that increase the potential for losing registration. Clearly, the usefulness of high-density storage devices using MEMS technology depends on the ability of these devices to maintain registration in light of the shock and vibration.

In particular, the linear electrostatic motor must be able to contend with both lateral and normal shock to the platform holding the storage medium. One problem is a lateral shock in the plane of the storage medium can be stronger than the electrostatic forces holding the storage medium platform in registration. If the lateral shock is strong enough, the shock can cause the platform to "skitter" relative to the atomic needle thus losing registration and possibly data.

Another problem concerns the shock normal to the plane of the storage medium. Typically, the platform supporting the storage medium is held in place by the restorative force of tiny flexures. Flexures include a variety of forms, often including beam-like structures arranged in a "zigzag" pattern. A shock normal to the storage plane drives the movable platform and its electrodes towards the stationary electrodes associated with the platform's supporting frame. As a result, the normal force combined with the electrostatic force of the linear motor can overcome the restorative force of the flexures and causes the platform to be pulled rapidly towards the stationary electrodes also resulting in data loss.

In light of the aforementioned problems, it is desirable to have robust high-density storage systems and electrostatic motors that can endure physical shocks and continue operating.

BRIEF DESCRIPTION OF THE DRAWINGS

The present invention is illustrated by way of example and not limitation in the figures of the accompanying drawings in which.

Like reference numbers and designations in the various drawings indicate like elements.

SUMMARY OF THE INVENTION

Aspects of the present invention feature a calibration method for a drive that includes changing an electrode voltage between a first set of electrodes and a second set of electrodes in the drive divided by an electrode gap, determining a threshold voltage for the electrode voltage at which an electrostatic attractive force causes the first set of electrodes to be drawn to the second set of electrodes and calculating an operational electrode voltage between the first set of electrodes and the second set of electrodes using the threshold voltage that allows the drive to operate while one or more external accelerations are acting upon the drive.

DETAILED DESCRIPTION

Implementations of the present invention concern calibrating an electrode voltage in a drive to improve the drive's tolerance to shock and vibration. In general, the calibration operation for the drive increases the electrode voltage until it reaches a threshold voltage and a mover in the drive is pulled down to a stator. The resulting gap between the mover and stator is inferred through electrical measurements from sensors associated with the drive and is more accurate than direct physical measurement. This threshold voltage and corresponding gap distance is then used to determine an operational electrode voltage that will provide acceptable operating margins in light of the expected external planar and normal accelerations due to shock and vibration. For example, the strength of the operational electrode voltage keeps the drive in registration or alignment allowing the stator and mover to operate normally yet not experience strong attractive forces to each other.

Aspects of the present invention are advantageous in at least one or more of the following ways. The calibration procedure is non-invasive and can be performed quickly without the potential of damaging the drive or associated motor. Quick calibration is also advantageous to the manufacture of electrostatic motors trying to lower costs and increase yields.

Yet another advantage of the calibration operation is to keep registration of the drive despite the expected external planar and normal accelerations. As previously mentioned, the threshold voltage selected by implementations of the present invention is high enough to keep registration and low enough to ensure that the mover and stator are not drawn together as a result.

Figure 1:
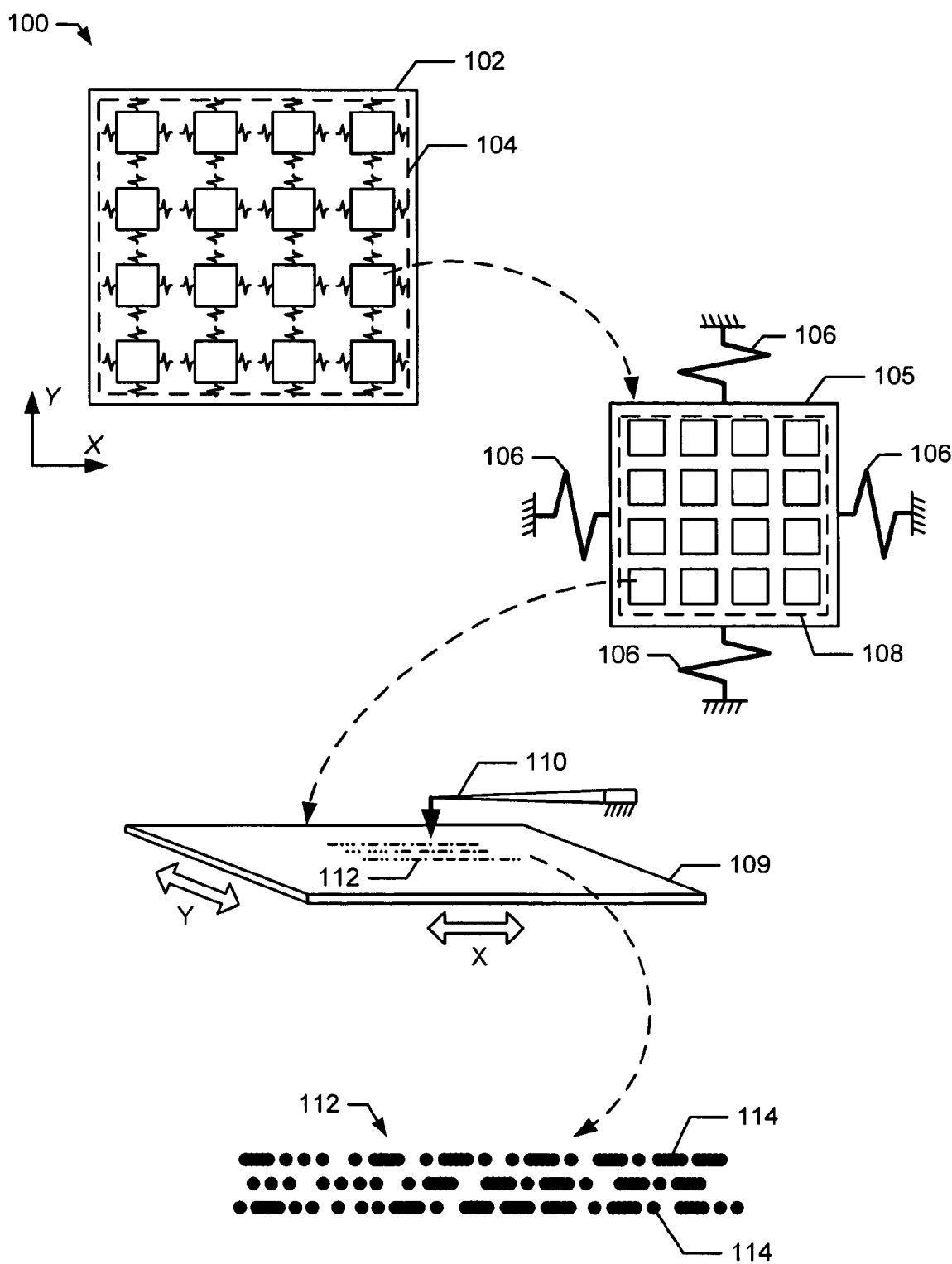
FIG. 1 is a diagram of a storage system incorporating an electrostatic motor in accordance with one implementation of the present invention.

Turning first to FIG. 1, a storage system 102 incorporates a linear electrostatic motor in accordance with one implementation of the present invention. Storage system 102 includes an array of movers 104 that move relative to the stators (not shown in FIG. 1) that are fixed in the linear electrostatic motor. As illustrated, each mover 105 carries an array of storage media 108 and is in turn supported by spring flexures 106. In this illustrated example, an atomically sharp needle 110, hereinafter needle 110, in a fixed position writes and reads data 112 on a storage medium 109 by depositing and sensing extremely small amounts of electric charge 114 along the x-axis. Needle 110 both stores and reads large amounts of data 112 as the aforementioned MEMS components in the linear electrostatic motor control very small movements of the platform holding the storage medium.

The calibration done in accordance with the present invention keeps each needle 110 properly aligned with the underlying associated storage media 109. In particular, calibrating each mover 105 in the array of movers 104 attains a balanced resistance to planar and normal accelerations by individually measuring and accommodating the electrode spacing variation introduced in the manufacturing process. Accurate and non-invasive measurement of this electrode spacing variation helps facilitate the calibration procedure without introducing potential inaccuracies brought on through direct or physical measurement of the electrode spacing or gap. Details on this calibration and gap measurement operation is provided in further detail later herein.

Figure 2:
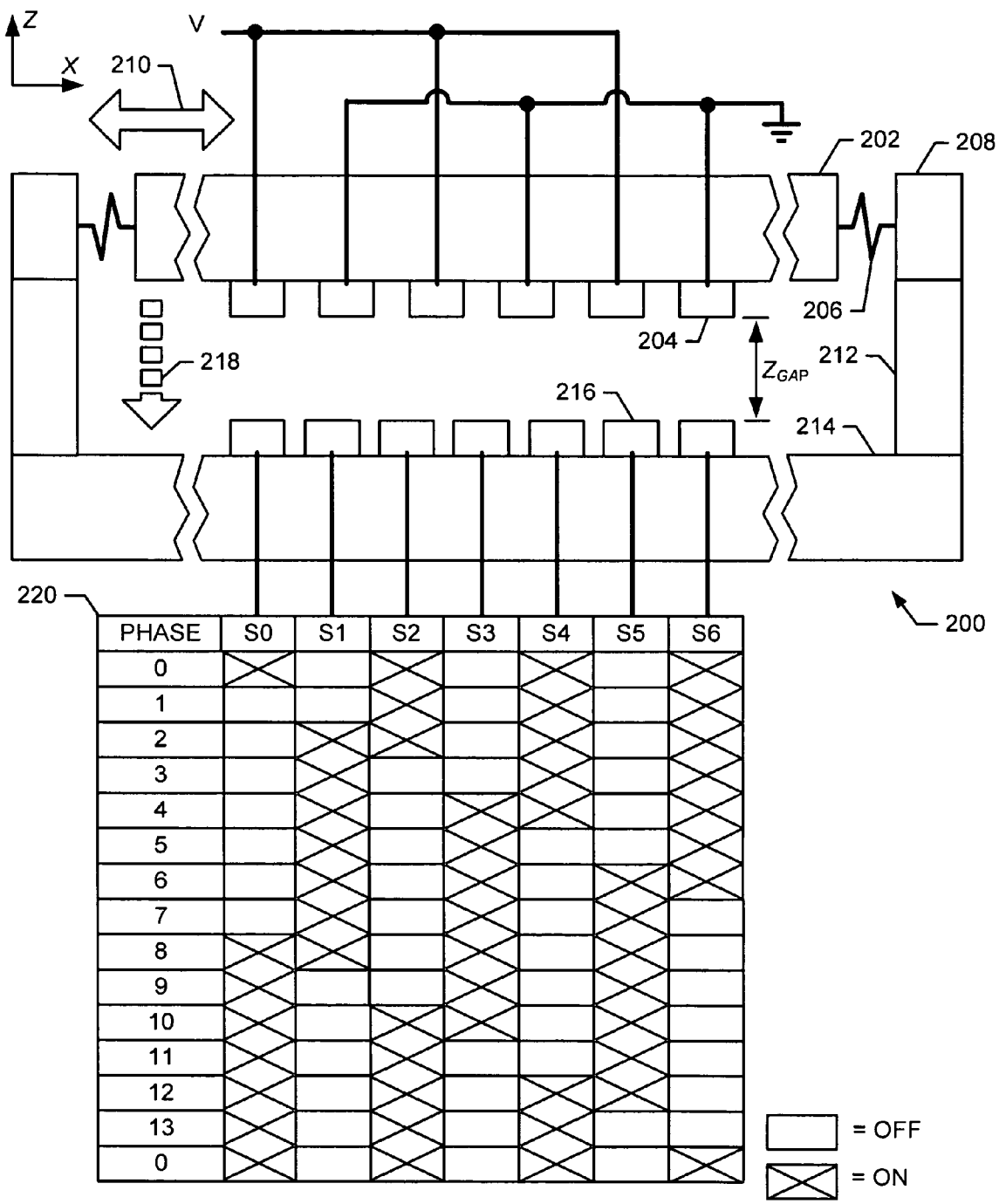
FIG. 2 is a side view diagram of an electrostatic motor and corresponding phase diagram in accordance with one implementation of the present invention.

FIG. 2 is a side view diagram of an electrostatic motor 200 in accordance with one implementation of the present invention. The diagram in FIG. 2 shows a side view with the x-axis running from left to right, the z-axis running from bottom to top, and the y-axis running into the page. Electrostatic motor 200 includes a mover 202 supported by flexures 206 attached to mover supports 208. A spacer 212 separates mover supports 208 and associated mover 202 from stator 214. Mover electrodes 204 are operatively attached to mover 202 and stator electrodes 216 are operatively attached to stator 214, respectively. A distance $Z_{GAP}$ describes the separation between mover electrodes 204 and stator electrodes 216.

Table 220 also in FIG. 2 shows a set of voltage sequences used to drive mover 202 along the x-axis as indicated by planar mover movement 210. In this example, 14 phases on the rows of table 220 are associated with moving mover 202 and are achieved by operating individual stator electrode voltages as indicated by the sequences in the columns of table 220, labeled $S_0$–$S_6$. A marked cell in the table indicates a voltage on stator electrodes 216 and an unmarked cell indicates no voltage on stator electrodes 216. Different combinations of voltage applied to stator electrodes 216 tend to move mover 202 in a linear manner corresponding to planar mover movement 210 as indicated and described in further detail later herein. Calibration performed in accordance with implementations of the present invention prevents undesirable motion of mover 202 along the z-axis towards stator 214 as indicated by normal mover movement 218.

Flexures 206 used in one implementation of the present invention as illustrated are configured as folded beam assemblies that provide nominal spring resistance in the x- and y-axes (mover plane of motion) while providing substantial spring resistance in the z-axis. This nominal planar spring resistance uses smaller electrostatic forces to hold mover 202 in registration while under the influence of external planar acceleration. Implementations of the present invention use smaller electrostatic forces as the resulting weaker electromagnetic force tends not to draw mover 202 towards stator 214 along the z-axis as indicated by normal mover movement 218. Stiffness along the z-axis provided by flexures 206 also resists the effects of external z-axis acceleration and normal mover movement 218.

Stator electrodes 216 and mover electrodes 204 are arranged to move linearly along opposite sides of a space described by the electromagnetic force between seven stator electrodes 216 and six mover electrodes 204. Multiple different voltages applied to stator electrodes 216 provide the required electrostatic drive force to operate the electrostatic motor 200. In this example, mover electrodes 204 are alternatingly fixed to voltage and ground as illustrated. In contrast, electromagnetic motor 200 applies different voltage sequences and ground levels to stator electrode 216 indicated by table 220 depending on the electrostatic force and direction desired. For example, table 220 in FIG. 2 illustrates one particular implementation of voltage and ground levels for moving mover 202 in one direction along the x-axis starting at phase 0 proceeding to phase 13 and then repeating the sequence. Reversing the sequence of voltage and ground levels applied to stator electrodes 216 drives mover 202 in the opposite direction.

In operation, holding all mover and stator voltages unchanged tends to hold mover 202 in a fixed position relative to stator 214. For example, assume a phase 0 static application of voltage (i.e., "on") and ground (i.e., "off") levels to stator electrodes 216 is as follows: $S_0$ on, $S_1$ off, $S_2$ on, $S_3$ off, $S_4$ on, $S_5$ off, and $S_6$. Holding this phase 0 configuration produces a set of electrostatic forces that tends to hold mover 202 in a fixed position relative to the linear spacing of mover electrodes 204 and stator electrodes 216. Changing the stator electrode voltages to the pattern indicated by phase 1 in table 220 causes mover 202 to incrementally change to a new stable position. If the stator electrode voltages are changed back to phase 0, mover 202 returns to its original position. Multiple mover-stator groupings result in multiple stable positions for any phase shown in table 220.

Calibration performed in accordance with the present invention prevents external accelerations from disturbing the stable operation of mover 202 and stator 214 as previously described. The drive in electrostatic motor 200 remains in registration despite the inevitable external shock and vibration delivering both planar and normal force on mover 202. As will be described in further detail later herein, the calibration done in one implementation of the present invention increases electrode voltages applied to stator electrodes 216 to a threshold voltage level thus resulting in a stronger electrostatic registration force. This threshold voltage is just strong enough to maintain the registration needed for stable operation yet does not contribute towards causing mover 202 to snap towards stator 214.

Figure 3:
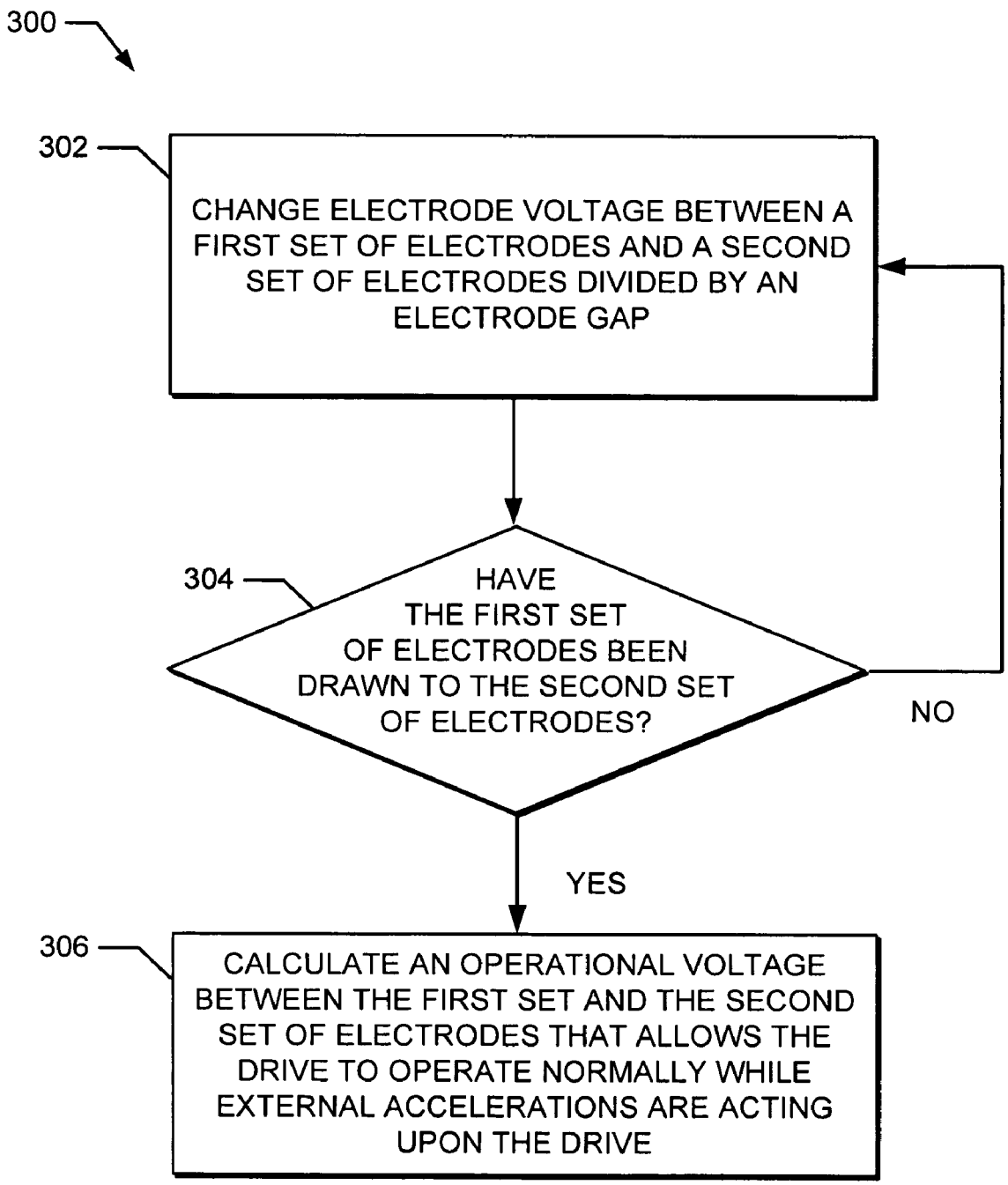
FIG. 3 is a flowchart diagram of the operations pertaining to calibrating an electrostatic motor in accordance with one implementation of the present invention.

FIG. 3 is a flowchart diagram 300 of the operations pertaining to calibrating a drive in accordance with one implementation of the present invention. The drive includes a first set of electrodes positioned in place with a restorative force and separated from a second set of electrodes by an electrode gap. In one implementation, the drive is an integrated portion of an electrostatic motor. For example, the first set of electrodes is operatively affixed to a mover assembly of the electrostatic motor and the second set of electrodes is operatively affixed to a stator assembly of the electrostatic motor.

The calibration operation begins by changing an electrode voltage between the first set of electrodes and the second set of electrodes (302). Changing the electrode voltage between the first and second sets of electrodes produces a different electrostatic force between them. For example, increasing the electrode voltage increases the electrostatic attractive force between the two sets of electrodes while decreasing the electrode voltage decreases the electrostatic attractive force. The electrode voltage can be controlled incrementally by changing the electrode voltage by one or more discrete increments or it may be adjusted continuously along a range. To discover the electrode voltage used for calibration, the electrode voltage can be adjusted linearly or non-linearly. A non-linear adjustment may include accommodating an approximation algorithm for setting the electrode voltage during calibration. For example, the electrode voltage can be determined using a succession of binary approximations sometimes referred to as a binary succession approximation algorithm.

The next operation determines if the first set of electrodes have been drawn to the second set of electrodes (304). If the first set of electrodes have not been drawn to the second set of electrodes then a threshold voltage associated with the drawing together of the two sets of electrodes has not yet been reached and the electrode voltage is changed once again (302). If the first set of electrodes has been drawn to the second set of electrodes then the threshold voltage has been reached. In one implementation, the threshold voltage is determined by detecting a rapid increase in the capacitance received from a capacitive sensor.

Upon reaching the threshold voltage, an operational electrode voltage is calculated between the first set of electrodes and the second set of electrodes that allows the drive to operate normally while external accelerations are acting upon the drive (306). In one implementation, the calculation is performed according to a model describing the interaction between the restorative forces and the electrostatic forces operating between the first set of electrodes and the second set of electrodes. The calculations used in the modeling consider that the restorative forces may be operating according to a linear function while the electrostatic forces operate instead according to a non-linear function. For example, this is the case when the restorative force is provided by a "spring" or flexures described by a linear or first-order function and the electrostatic force operates according to a non-linear or higher-order function. As described later herein, implementations of the present invention mathematically model the force associated with the linear behavior of the flexure and the non-linear force associated with the electrostatic force in determining the appropriate electrode voltage and the operational electrode voltage used in calibrating the drive.

Figure 4:
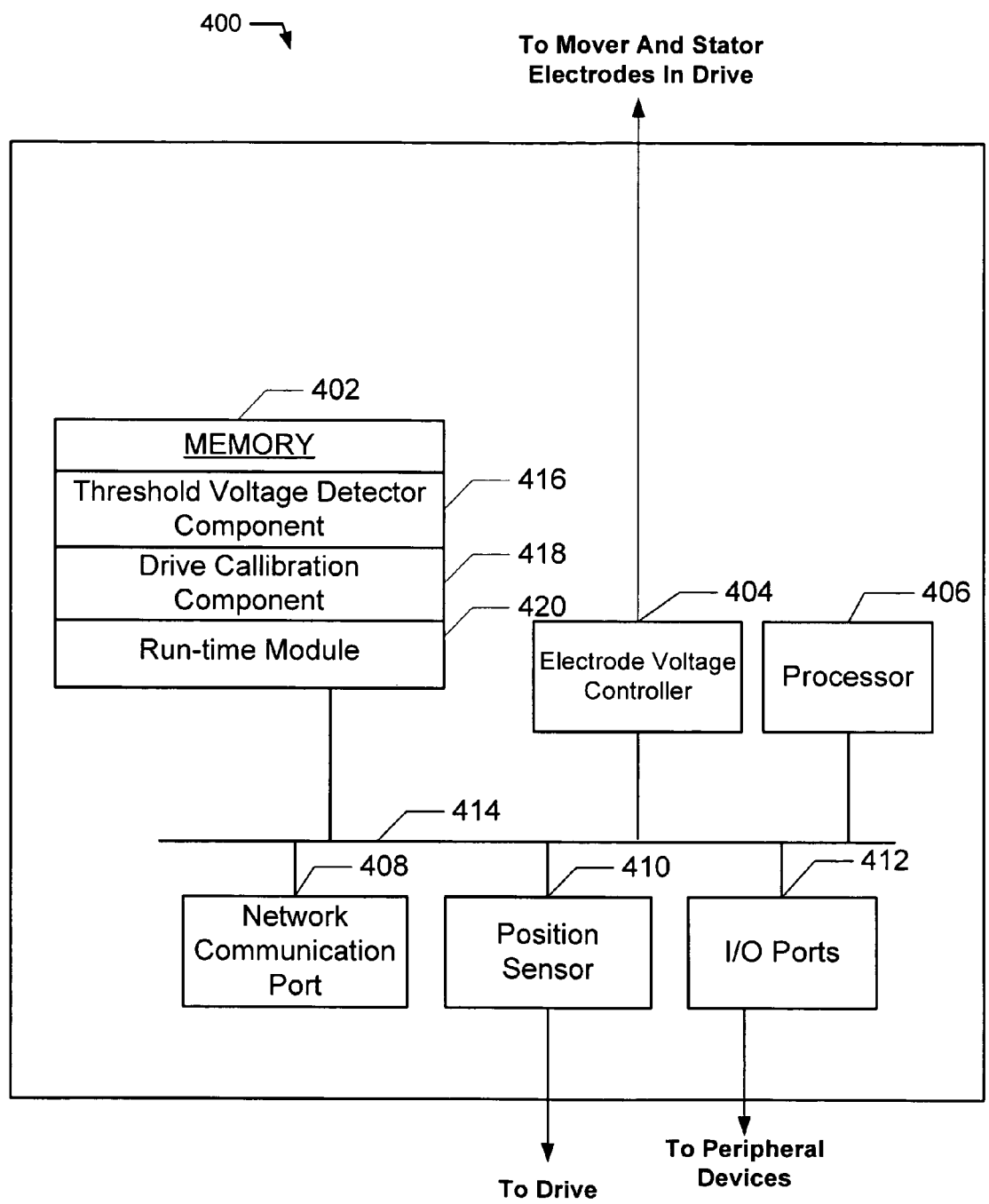
FIG. 4 is a diagram an electrostatic motor calibration apparatus in accordance with one implementation of the present invention.

FIG. 4 depicts a system 400 designed in accordance with one implementation the present invention for calibrating a drive in an electrostatic motor. System 400 includes a memory 402 to hold executing programs (typically random access memory (RAM) or read-only memory (ROM) such as a flash RAM), an electrode voltage controller 404 that interfaces with the electrodes in the drive used in an electrostatic motor or other device, a processor 406, a network communication port 408 for data communication, a position sensor 410 also coupled to the drive in the electrostatic motor or other device and input/output (I/O) ports 412 also all operatively coupled together over a interconnect 414. System 400 can be preprogrammed, in ROM; for example, using field-programmable gate array (FPGA) technology or it can be programmed (and reprogrammed) by loading a program from another source (for example, from a floppy disk, a CD-ROM, or another computer). Also, any or all parts of system 400 can be implemented using one or more customized application specific integrated circuits (ASICs).

Memory 402 includes a threshold voltage detector component 416 and a drive calibration component 418 in addition to run-time module 420. Threshold voltage detector component 416 processes information gathered during the calibration operation performed in accordance with the present invention and identifies the threshold voltage when the electrodes in the drive of an electrostatic motor or other device "snap" or come together. In one implementation, threshold voltage detector component 414 determines a threshold voltage at which the electrostatic attractive force overcomes the restorative force from the flexures associated with the drive. At this threshold voltage, the electrostatic force causes the first set of electrodes to be drawn to the second set of electrodes despite the restorative force from the flexures. In some cases, threshold voltage detector component 414 uses information generated by modeling operation of the electrodes and other components of the drive. Alternatively, threshold voltage detector component 414 may also use additional information collected from sensors associated with the electrodes and other components of the drive.

Drive calibration component 416 uses the threshold voltage information provided by threshold voltage detector component 414 and other information regarding the drive to determine the operational electrode voltage for calibrating the drive. As previously described, this operational electrode voltage sets the electrostatic force between the electrodes to render the drive resilient to reasonable levels of mechanical shock and vibration. This electrode voltage keeps the electrodes associated with the drive in registration and thus operating accurately and as expected by the device. For example, a linear electrostatic motor used in a storage device would ensure the operational electrode voltage is applied to keep the drive in registration and reduce potential data loss or corruption.

In one implementation, electrode voltage controller 404 adjusts the electrode voltage in discrete increments or, alternatively, along a continuum of voltage levels. As previously described, these adjustments can be done in either a linear manner using equal sized adjustments or in a non-linear manner involving different sized adjustments of the electrode voltage. Electrode voltage controller transmits control signals to the move and stator electrodes in a drive (not illustrated) as used in an electrostatic motor or other electrostatic device. The drive includes a first set of electrodes and a second set of electrodes separated by an electrode gap and having an electrode voltage level in between the electrodes. The electrodes associated with the drive in an electrostatic motor that move are referred to as mover electrodes while the electrodes from the drive that are stationary are identified as stator electrodes.

Position sensor 410 is also operatively coupled to the drive and collects position information during the operation of the drive. For example, position sensor 410 can be coupled to a mover electrode associated with the drive and used to detect when the mover electrode snaps down to the stator or fixed electrode in the drive. In one implementation as illustrated, position sensor 410 sends the electrode position information associated with the drive to threshold voltage detector component 416 where it is processed and used in accordance with implementations of the present invention.

Figure 5A:
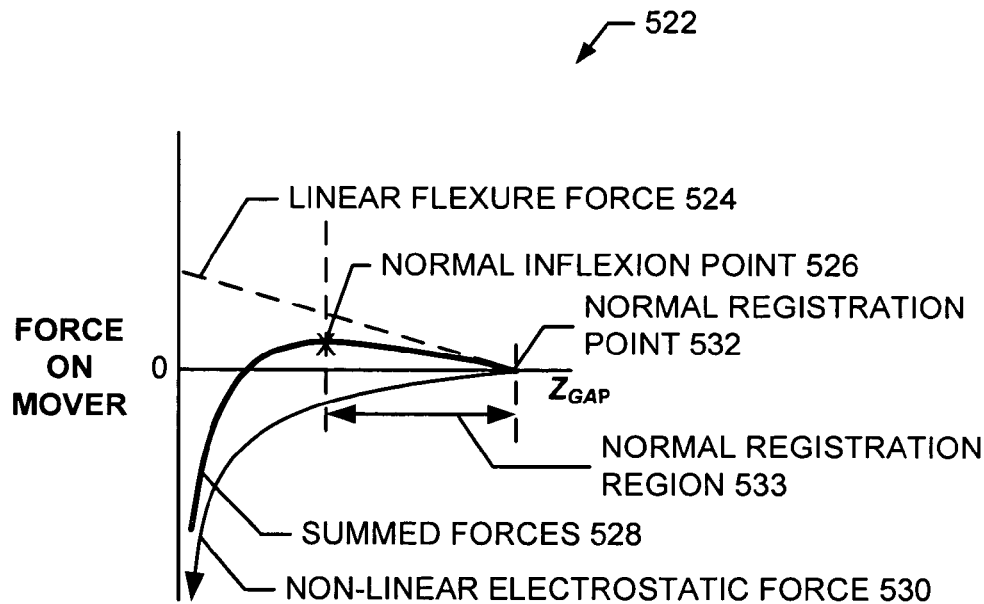
FIG. 5A is a graph of the normal forces acting upon the mover of an electrostatic motor in accordance with one implementation of the present invention.

FIG. 5A is a graph 522 of external forces operating substantially perpendicular to the mover electrode's plane of motion in accordance with one implementation of the present invention. For example, the external force on the mover electrode could be caused by dropping the electrostatic motor or subjecting the electrostatic motor to substantially perpendicular vibration. Information represented by this graph helps determine an operational electrode voltage used when calibrating an electrostatic motor in accordance with implementations of the present invention.

Graph 522 shows a linear flexure force 524, a non-linear electrostatic force 530, and summed forces 528 plotted as a function of the distance between the mover and stator electrodes (i.e., the $Z_{GAP}$). The vertical axis of graph 522 shows the forces relative to an normal registration point 532 defined to be zero and between linear flexure force 524 and non-linear electrostatic force 530. For example, the normal registration point 532 represents an equilibrium point when the electrostatic motor is operating normally. Normal inflexion point 526 is marked with an X and identifies where the slope of summed forces 528 changes from negative to positive. The distance between normal registration point 532 and normal inflexion point 526 represents a normal registration region 533 for placement of the mover electrode and calibrating the drive.

As previously described, an external acceleration normal to the mover electrode's plane of motion can cause the mover electrode to move towards the stator electrode reducing the value of $Z_{GAP}$ and away from normal registration point 532. Simultaneously, linear flexure force 524 enters into a positive flexure force area as the mover electrode approaches the stator electrode. Up to the normal inflexion point 526, this positive flexure force tends to cause the mover electrode to return back to the desired normal registration point 532. As the value of $Z_{GAP}$ is reduced, however, the non-linear electrostatic force 530 increases negatively opposing the positive flexure force and acting to pull mover electrode closer to the stator electrode and away from normal registration point 532.

Mover electrode generally can return to normal registration point 532 when the external acceleration is removed as long as summed forces 528 remains negative. Generally, this depends on the value of $Z_{GAP}$ or the distance between the mover electrode and the stator electrode. Consequently, forcing the mover electrode beyond normal inflexion point 526 causes it to be increasingly drawn toward stator electrode due to a rapidly increasing and negative non-linear electrostatic force 530. Eventually, the mover electrode snaps down upon the stator electrode as the electrostatic force 530 doubles in strength for every halving of $Z_{GAP}$ and overcomes linear flexure force 524.

Figure 5B:
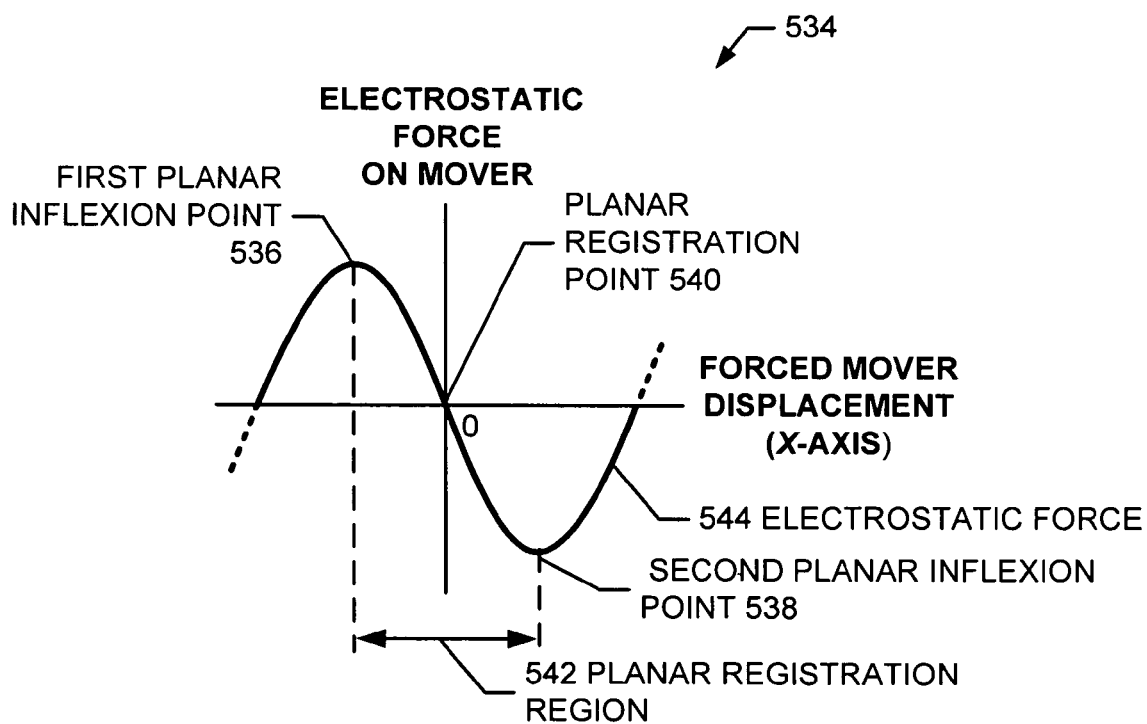
FIG. 5B is a graph of in-plane forces acting upon the mover of an electrostatic motor in accordance with one implementation of the present invention.

FIG. 5B is a graph 534 of planar forces acting upon the mover electrode of an electrostatic motor in accordance with one implementation of the present invention. Graph 534 shows an electrostatic force 544 on mover electrode as a function of the forced displacement of mover electrode along its x-axis of motion. For example, this could also be caused by dropping or vibrating an electrostatic motor along the x-axis of motion. In FIG. 5B, a first planar inflexion point 536 marks the point when the mover electrode is displaced in the negative x direction and the slope of electrostatic force 544 changes from negative to positive. Similarly, a second planar inflexion point 538 marks the point where the mover electrode is displaced in the positive x direction and the slope of electrostatic force 544 changes from negative to positive. Accordingly, a planar registration region 542 is defined when the mover electrode position along the x-axis is between first planar inflexion point 536 and second planar inflexion point 538. Further, planar registration point 540 represents a normal resting position for the mover electrode when it is operating properly.

To a certain point, an external force pushing the mover electrode in the negative x direction away from planar registration point 540 is countered by a restorative electrostatic force in a positive direction. This restorative electrostatic force occurs upon a relative displacement of the mover electrodes and the stator electrodes away from an equilibrium position represented on graph 534 as planar registration point 540. Removing the external force before the mover electrodes reach first planar inflexion point 536 allows the mover electrodes to return to planar registration point 540 and continue operating. However, if the external force pushes the mover electrode past first planar inflexion point 536 it is likely the registration along the plane will be lost. For example, pulling mover electrode in the negative x direction beyond first planar inflexion point 536 causes the slope of electrostatic force curve 544 to change from negative to positive and incur a potential loss of registration. Mover electrode behaves in a similar manner with respect to planar registration point 540 when it instead is forced in the positive x direction beyond second planar inflexion point 538.

As indicated by both FIG. 5A and FIG. 5B, losing registration is problematic for an electrostatic drive and motor controlling a high-density storage device. This is particularly true when a high-density storage device is used in a portable digital appliance such as a camera or music player as these portable electronic appliances are subject to physical shock (i.e., external acceleration) due to normal handling and accidental dropping.

Implementations of the present invention keep these high-density storage devices in registration by selecting a proper operational electrode voltage. Using the information presented in both FIG. 5A and FIG. 5B, the operational electrode voltage on the mover electrode is increased to resist acceleration in the plane of motion. However, the electrode voltage is not increased to a high enough value to cause the electrostatic force between the mover electrode and stator electrodes to accelerate normal to the plane of motion and pull together. Implementations of the present invention are used to determine this operational electrode voltage and ensure maximum resistance to expected values of external acceleration both normal to the plane of movement and in the plane of movement for the mover electrode.

While specific embodiments have been described herein for the purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A calibration method for a drive, comprising:
   changing an electrode voltage between a first set of electrodes and a second set of electrodes in the drive divided by an electrode gap corresponding to a restorative force that separates the first set of electrodes and the second set of electrodes and an opposing attractive electrostatic force between the first set of electrodes and the second set of electrodes corresponding to the electrode voltage;
   determining a threshold voltage for the electrode voltage at which an electrostatic attractive force causes the first set of electrodes to be drawn to the second set of electrodes; and
   calculating an operational electrode voltage between the first set of electrodes and the second set of electrodes using the threshold voltage that allows the drive to operate while one or more external accelerations are acting upon the drive.

2. The calibration method of claim 1 wherein changing the electrode voltage further includes adjusting the electrode voltage in one or more increments.

3. The calibration method of claim 1 wherein changing the electrode voltage further includes adjusting the electrode voltage along a continuum.

4. The calibration method of claim 1 wherein changing the electrode voltage further includes adjusting the electrode voltage linearly.

5. The calibration method of claim 1 wherein changing the electrode voltage further includes adjusting the electrode voltage non-linearly.

6. The calibration method of claim 1 wherein changing the electrode voltage further includes adjusting the electrode voltage according to a binary successive approximation operation.

7. The calibration method of claim 1 wherein the threshold voltage is determined by detecting a rapid increase in capacitance received from a capacity sensor.

8. The calibration method of claim 1 wherein the threshold voltage is determined when the electrostatic attractive force overcomes the restorative force.

9. The calibration method of claim 1 wherein calculating the operational electrode voltage includes modeling the interaction between the restorative forces and the electrostatic forces operating between the first set of electrodes and the second set of electrodes.

10. The calibration method of claim 9 wherein the restorative force operates according to a linear function and the electrostatic forces operate according to a non-linear function.

11. The calibration method of claim 1 wherein the drive is an electrostatic motor.

12. The calibration method of claim 11 wherein the first set of electrodes is operatively affixed to a mover and the second set of electrodes is operatively affixed to a stator.

13. The calibration method of claim 1 wherein the restorative force between the first set of electrodes and the second set of electrodes is provided by one or more flexures.

14. A calibration apparatus for a drive, comprising:
   an electrode voltage controller that changes an electrode voltage between a first set of electrodes and a second set of electrodes in the drive divided by an electrode gap corresponding to a restorative force that separates the first set of electrodes and the second set of electrodes and an opposing attractive electrostatic force between the first set of electrodes and the second set of electrodes corresponding to the electrode voltage;
   a threshold voltage detector component and sensor that determines a threshold voltage for the electrode voltage at which an electrostatic attractive force causes the first set of electrodes to be drawn to the second set of electrodes; and
   a drive calibration component that calculates an operational electrode voltage between the first set of electrodes and the second set of electrodes using the threshold voltage that allows the drive to operate while one or more external accelerations are acting upon the drive.

15. The calibration apparatus of claim 14 wherein the electrode voltage controller further adjusts the electrode voltage in one or more increments.

16. The calibration apparatus of claim 14 wherein the electrode voltage controller further adjusts the electrode voltage along a continuum.

17. The calibration apparatus of claim 14 wherein the electrode voltage controller further adjusts the electrode voltage linearly.

18. The calibration apparatus of claim 14 wherein the electrode voltage controller further adjusts the electrode voltage non-linearly.

19. The calibration apparatus of claim 14 wherein the electrode voltage controller further adjusts the electrode voltage according to a binary successive approximation operation.

20. The calibration apparatus of claim 14 wherein the threshold voltage is determined by detecting a rapid increase in capacitance received from a capacity sensor.

21. The calibration apparatus of claim 14 wherein the threshold voltage is determined when the electrostatic attractive force overcomes the restorative force.

22. The calibration apparatus of claim 14 wherein calculating the operational electrode voltage includes modeling the interaction between the restorative forces and the electrostatic forces operating between the first set of electrodes and the second set of electrodes.

23. The calibration apparatus of claim 22 wherein the restorative force operates according to a linear function and the electrostatic forces operate according to a non-linear function.

24. The calibration apparatus of claim 14 wherein the drive is an electrostatic motor.

25. The calibration apparatus of claim 24 wherein the first set of electrodes is operatively affixed to a mover and the second set of electrodes is operatively affixed to a stator.

26. The calibration method of claim 14 wherein the restorative force between the first set of electrodes and the second set of electrodes is provided by one or more flexures.

27. A computer program product for calibrating a drive, comprising instructions operable to cause a programmable processor to:
- change an electrode voltage between a first set of electrodes and a second set of electrodes in the drive divided by an electrode gap corresponding to a restorative force that separates the first set of electrodes and the second set of electrodes and an opposing attractive electrostatic force between the first set of electrodes and the second set of electrodes corresponding to the electrode voltage;
- determine a threshold voltage for the electrode voltage at which an electrostatic attractive force causes the first set of electrodes to be drawn to the second set of electrodes; and
- calculate an operational electrode voltage between the first set of electrodes and the second set of electrodes using the threshold voltage that allows the drive to operate while one or more external accelerations are acting upon the drive.

28. The computer program product of claim 27 wherein changing the electrode voltage further includes instructions that adjust the electrode voltage in one or more increments.

29. The computer program product of claim 27 wherein changing the electrode voltage further includes instructions that adjust the electrode voltage according to a binary successive approximation operation.

30. The computer program product of claim 27 wherein the threshold voltage is determined when the electrostatic attractive force overcomes the restorative force.

31. The computer program product of claim 27 wherein the restorative force operates according to a linear function and the electrostatic forces operate according to a non-linear function.

32. A calibration apparatus for a drive, comprising:
- means for changing an electrode voltage between a first set of electrodes and a second set of electrodes in the drive divided by an electrode gap corresponding to a restorative force that separates the first set of electrodes and the second set of electrodes and an opposing attractive electrostatic force between the first set of electrodes and the second set of electrodes corresponding to the electrode voltage;
- means for determining a threshold voltage for the electrode voltage at which an electrostatic attractive force causes the first set of electrodes to be drawn to the second set of electrodes; and
- means for calculating an operational electrode voltage between the first set of electrodes and the second set of electrodes using the threshold voltage that allows the drive to operate while one or more external accelerations are acting upon the drive.

* * * * *